United States Patent
Edwards et al.

(10) Patent No.: US 7,349,578 B2
(45) Date of Patent: *Mar. 25, 2008

(54) SYSTEM AND METHOD FOR EDITING DIGITAL IMAGES

(75) Inventors: Eric Edwards, San Francisco, CA (US); Clay Harvey Fisher, Belmont, CA (US); Kurt Jonach, San Jose, CA (US); Neal Jacob Manowitz, Mahwah, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,504

(22) Filed: Nov. 13, 2006

(65) Prior Publication Data

US 2007/0058886 A1    Mar. 15, 2007

Related U.S. Application Data

(63) Continuation of application No. 09/769,686, filed on Jan. 24, 2001, now Pat. No. 7,136,528.

(60) Provisional application No. 60/181,844, filed on Feb. 11, 2000.

(51) Int. Cl.
*G06K 9/62* (2006.01)

(52) U.S. Cl. .................. 382/209; 345/629; 382/274; 382/309

(58) Field of Classification Search ............. 345/629; 358/537; 382/209, 309, 311
See application file for complete search history.

(56) References Cited

U.S. PATENT DOCUMENTS

| | | | |
|---|---|---|---|
| 3,785,721 A | 1/1974 | Harsch | |
| 4,305,131 A | 12/1981 | Best | |
| 4,485,409 A | 11/1984 | Schumacher | |
| 4,707,742 A | 11/1987 | Field et al. | |
| 4,902,128 A | 2/1990 | Siebecker et al. | |
| 4,905,294 A | 2/1990 | Sugiura et al. | |
| 4,907,086 A | 3/1990 | Truong | |
| 4,942,391 A | 7/1990 | Kikuta | |
| 4,954,970 A | 9/1990 | Walker et al. | |
| 5,019,858 A | 5/1991 | Suzuki | |
| 5,091,967 A | 2/1992 | Ohsawa | |
| 5,099,331 A | 3/1992 | Truong | |
| 5,100,154 A | 3/1992 | Mullins | |
| 5,111,410 A | 5/1992 | Nakayama et al. | |
| 5,187,754 A | 2/1993 | Currin et al. | |
| 5,193,000 A | 3/1993 | Lipton et al. | |
| 5,267,154 A | 11/1993 | Takeuchi et al. | |
| 5,270,806 A | 12/1993 | Venable et al. | |
| 5,303,148 A | 4/1994 | Mattson et al. | |
| 5,325,449 A | 6/1994 | Burt et al. | |
| 5,327,521 A | 7/1994 | Savic et al. | |
| 5,428,723 A | 6/1995 | Ainscow et al. | |

(Continued)

*Primary Examiner*—Gregory M Desire
(74) *Attorney, Agent, or Firm*—Blakely, Sokoloff, Taylor & Zafman LLP

(57) ABSTRACT

A system and method for editing digital images are described. The system for editing digital images forms an image template containing a selected record of one or more image editing operations performed on a first image to obtain a first edited image. The image template also contains the first edited image. The system then applies the image template to one or more second images.

19 Claims, 4 Drawing Sheets

U.S. PATENT DOCUMENTS

| | | |
|---|---|---|
| 5,465,163 A | 11/1995 | Yoshihara et al. |
| 5,477,264 A | 12/1995 | Sarbadhikari et al. |
| 5,488,674 A | 1/1996 | Burt et al. |
| 5,524,071 A | 6/1996 | Yokomizo |
| 5,559,707 A | 9/1996 | DeLorme et al. |
| 5,561,745 A | 10/1996 | Jackson et al. |
| 5,600,765 A | 2/1997 | Ando et al. |
| 5,606,656 A | 2/1997 | Yamaguchi |
| 5,611,028 A | 3/1997 | Shibasaki et al. |
| 5,615,123 A | 3/1997 | Davidson et al. |
| 5,629,988 A | 5/1997 | Burt et al. |
| 5,630,037 A | 5/1997 | Schindler |
| 5,633,678 A | 5/1997 | Parulski et al. |
| 5,634,012 A | 5/1997 | Stefik et al. |
| 5,643,088 A | 7/1997 | Vaughn et al. |
| 5,649,032 A | 7/1997 | Burt et al. |
| 5,675,733 A | 10/1997 | Williams |
| 5,679,075 A | 10/1997 | Forrest et al. |
| 5,682,326 A | 10/1997 | Klingler et al. |
| 5,682,525 A | 10/1997 | Bouve et al. |
| 5,684,942 A | 11/1997 | Kimura |
| 5,689,575 A | 11/1997 | Sako et al. |
| 5,694,331 A | 12/1997 | Yamamoto et al. |
| 5,706,368 A | 1/1998 | Mita |
| 5,710,887 A | 1/1998 | Chelliah et al. |
| 5,720,806 A | 2/1998 | Fujii et al. |
| 5,721,827 A | 2/1998 | Logan et al. |
| 5,727,093 A | 3/1998 | Uchiyama et al. |
| 5,727,174 A | 3/1998 | Aparicio, IV et al. |
| 5,727,201 A | 3/1998 | Burke |
| 5,732,146 A | 3/1998 | Yamada et al. |
| 5,732,161 A | 3/1998 | Kuroda et al. |
| 5,732,216 A | 3/1998 | Logan et al. |
| 5,734,823 A | 3/1998 | Saigh et al. |
| 5,737,538 A | 4/1998 | Wilhite |
| 5,740,549 A | 4/1998 | Reilly et al. |
| 5,748,898 A | 5/1998 | Ueda |
| 5,751,838 A | 5/1998 | Cox et al. |
| 5,751,848 A | 5/1998 | Farrell |
| 5,760,916 A | 6/1998 | Dellert et al. |
| 5,767,893 A | 6/1998 | Chen et al. |
| 5,768,142 A | 6/1998 | Jacobs |
| 5,768,528 A | 6/1998 | Stumm |
| 5,771,354 A | 6/1998 | Crawford |
| 5,781,665 A | 7/1998 | Cullen et al. |
| 5,794,006 A | 8/1998 | Sanderman |
| 5,802,292 A | 9/1998 | Mogul |
| 5,802,361 A | 9/1998 | Wang et al. |
| 5,805,745 A | 9/1998 | Graf |
| 5,819,092 A | 10/1998 | Ferguson et al. |
| 5,831,590 A | 11/1998 | Ikedo |
| 5,831,617 A | 11/1998 | Bhukhanwala |
| 5,835,087 A | 11/1998 | Herz et al. |
| 5,838,828 A | 11/1998 | Mizuki et al. |
| 5,838,837 A | 11/1998 | Hirosawa |
| 5,838,839 A | 11/1998 | Seki et al. |
| 5,841,899 A | 11/1998 | Ide et al. |
| 5,845,062 A | 12/1998 | Branton, Jr. et al. |
| 5,845,281 A | 12/1998 | Benson et al. |
| 5,848,183 A | 12/1998 | Farrell |
| 5,850,474 A | 12/1998 | Fan et al. |
| 5,852,450 A | 12/1998 | Thingvold |
| 5,852,683 A | 12/1998 | Jewel |
| 5,855,516 A | 1/1999 | Eiba |
| 5,857,074 A | 1/1999 | Johnson |
| 5,861,871 A | 1/1999 | Venable |
| 5,864,329 A | 1/1999 | Hirokawa |
| 5,864,827 A | 1/1999 | Wilson |
| 5,870,717 A | 2/1999 | Wiecha |
| 5,872,637 A | 2/1999 | Nakanishi |
| 5,880,778 A | 3/1999 | Akagi |
| 5,881,166 A | 3/1999 | Farrell |
| 5,881,168 A | 3/1999 | Takaoka et al. |
| 5,881,182 A | 3/1999 | Fiete et al. |
| 5,884,280 A | 3/1999 | Yoshioka et al. |
| 5,889,868 A | 3/1999 | Moskowitz et al. |
| 5,890,175 A | 3/1999 | Wong et al. |
| 5,897,622 A | 4/1999 | Blinn et al. |
| 5,905,819 A | 5/1999 | Daly |
| 5,918,009 A | 6/1999 | Gehani et al. |
| 5,920,657 A | 7/1999 | Bender et al. |
| 5,923,846 A | 7/1999 | Gage et al. |
| 5,924,090 A | 7/1999 | Krellenstein |
| 5,930,405 A | 7/1999 | Chida |
| 5,933,524 A | 8/1999 | Schuster et al. |
| 5,937,104 A | 8/1999 | Henderson et al. |
| 5,937,392 A | 8/1999 | Alberts |
| 5,940,600 A | 8/1999 | Staats et al. |
| 5,940,806 A | 8/1999 | Danial |
| 5,942,969 A | 8/1999 | Wicks |
| 5,944,769 A | 8/1999 | Musk et al. |
| 5,948,040 A | 9/1999 | DeLorme et al. |
| 5,948,061 A | 9/1999 | Merriman et al. |
| 5,949,875 A | 9/1999 | Walker et al. |
| 5,956,716 A | 9/1999 | Kenner et al. |
| 5,960,409 A | 9/1999 | Wexler |
| 5,963,664 A | 10/1999 | Kumar et al. |
| 5,968,120 A | 10/1999 | Guedalia |
| 5,970,183 A | 10/1999 | Amemiya et al. |
| 5,973,734 A | 10/1999 | Anderson |
| 5,974,198 A | 10/1999 | Hamburg et al. |
| 5,974,451 A | 10/1999 | Simmons |
| 5,978,519 A | 11/1999 | Bollman et al. |
| 5,982,891 A | 11/1999 | Ginter et al. |
| 5,982,931 A | 11/1999 | Ishimaru |
| 5,982,941 A | 11/1999 | Loveridge et al. |
| 5,982,944 A | 11/1999 | Vaidyanathan et al. |
| 5,982,951 A | 11/1999 | Katayama et al. |
| 5,983,200 A | 11/1999 | Slotznick |
| 5,986,660 A | 11/1999 | Sweatt, III |
| 5,987,166 A | 11/1999 | Hayashi et al. |
| 5,990,860 A | 11/1999 | Takeuchi |
| 5,990,908 A | 11/1999 | Thingvold |
| 5,991,740 A | 11/1999 | Messer |
| 5,999,662 A | 12/1999 | Burt et al. |
| 6,000,832 A | 12/1999 | Franklin et al. |
| 6,005,987 A | 12/1999 | Nakamura et al. |
| 6,006,197 A | 12/1999 | d'Eon |
| 6,006,231 A | 12/1999 | Popa |
| 6,011,537 A | 1/2000 | Slotznick |
| 6,014,471 A | 1/2000 | Barkan et al. |
| 6,014,701 A | 1/2000 | Chaddha |
| 6,016,354 A | 1/2000 | Lin et al. |
| 6,016,356 A | 1/2000 | Ito et al. |
| 6,018,600 A | 1/2000 | Levin et al. |
| 6,018,761 A | 1/2000 | Uomini |
| 6,020,886 A | 2/2000 | Jacober |
| 6,021,433 A | 2/2000 | Payne et al. |
| 6,023,521 A | 2/2000 | Sarpeshkar et al. |
| 6,023,701 A | 2/2000 | Malik et al. |
| 6,026,183 A | 2/2000 | Talluri et al. |
| 6,026,200 A | 2/2000 | Okude et al. |
| 6,026,371 A | 2/2000 | Beck et al. |
| 6,028,583 A | 2/2000 | Hamburg |
| 6,028,985 A | 2/2000 | Okuyama |
| 6,032,156 A | 2/2000 | Marcus |
| 6,034,759 A | 3/2000 | Enomoto |
| 6,035,323 A | 3/2000 | Narayen et al. |
| 6,037,937 A | 3/2000 | Beaton et al. |
| 6,041,316 A | 3/2000 | Allen |
| 6,044,181 A | 3/2000 | Szeliski et al. |
| 6,052,492 A | 4/2000 | Bruckhaus |
| 6,052,600 A | 4/2000 | Fette et al. |
| 6,054,999 A | 4/2000 | Strandberg |

| Patent Number | Date | Inventor(s) |
|---|---|---|
| 6,058,379 A | 5/2000 | Odom et al. |
| 6,058,428 A | 5/2000 | Wang et al. |
| 6,061,471 A | 5/2000 | Coleman, Jr. |
| 6,067,095 A | 5/2000 | Danieli |
| 6,069,707 A * | 5/2000 | Pekelman .................. 358/1.6 |
| 6,074,299 A | 6/2000 | Cohen |
| 6,076,077 A | 6/2000 | Saito |
| 6,083,158 A | 7/2000 | Bearman et al. |
| 6,085,195 A | 7/2000 | Hoyt et al. |
| 6,085,249 A | 7/2000 | Wang et al. |
| 6,088,702 A | 7/2000 | Plantz et al. |
| 6,097,389 A | 8/2000 | Morris et al. |
| 6,102,406 A | 8/2000 | Miles et al. |
| 6,102,796 A | 8/2000 | Pajitnov et al. |
| 6,104,441 A | 8/2000 | Wee et al. |
| 6,109,923 A | 8/2000 | Rothenberg |
| 6,112,226 A | 8/2000 | Weaver et al. |
| 6,115,052 A | 9/2000 | Freeman et al. |
| 6,118,459 A | 9/2000 | Hunter |
| 6,123,362 A | 9/2000 | Squilla et al. |
| 6,125,385 A | 9/2000 | Wies et al. |
| 6,141,666 A | 10/2000 | Tobin |
| 6,144,726 A | 11/2000 | Cross |
| 6,147,742 A | 11/2000 | Bell et al. |
| 6,148,280 A | 11/2000 | Kramer |
| 6,154,755 A | 11/2000 | Dellert et al. |
| 6,167,382 A | 12/2000 | Sparks |
| 6,169,544 B1 | 1/2001 | Onoda |
| 6,169,854 B1 | 1/2001 | Hasegawa et al. |
| 6,178,258 B1 | 1/2001 | Sugimoto |
| 6,192,183 B1 | 2/2001 | Taniguchi et al. |
| 6,195,101 B1 | 2/2001 | Ghislain Bossut et al. |
| 6,195,458 B1 | 2/2001 | Warnick et al. |
| 6,201,548 B1 | 3/2001 | Cariffe et al. |
| 6,202,061 B1 | 3/2001 | Kholsa et al. |
| 6,202,155 B1 | 3/2001 | Tushie et al. |
| 6,215,498 B1 | 4/2001 | Filo et al. |
| 6,216,112 B1 | 4/2001 | Fuller et al. |
| 6,222,570 B1 | 4/2001 | Takayama et al. |
| 6,222,947 B1 | 4/2001 | Koba |
| 6,224,486 B1 | 5/2001 | Wlaker et al. |
| 6,230,194 B1 | 5/2001 | Frailong et al. |
| 6,237,010 B1 | 5/2001 | Hui et al. |
| 6,256,451 B1 | 7/2001 | Mitsui |
| 6,272,231 B1 | 8/2001 | Maurer et al. |
| 6,272,532 B1 | 8/2001 | Feinleib |
| 6,282,330 B1 | 8/2001 | Yokota et al. |
| 6,301,555 B2 | 10/2001 | Hinderks et al. |
| 6,301,586 B1 | 10/2001 | Yang et al. |
| 6,307,979 B1 | 10/2001 | Kondo et al. |
| 6,313,835 B1 | 11/2001 | Gever et al. |
| 6,313,902 B1 | 11/2001 | Enomoto |
| 6,321,202 B1 | 11/2001 | Raveis, Jr. |
| 6,324,545 B1 | 11/2001 | Morag |
| 6,333,752 B1 | 12/2001 | Hasegawa et al. |
| 6,336,052 B1 | 1/2002 | Ouellet et al. |
| 6,340,971 B1 | 1/2002 | Janse et al. |
| 6,341,279 B1 | 1/2002 | Nye |
| 6,344,903 B1 * | 2/2002 | Derhak et al. ............... 358/1.9 |
| 6,351,321 B1 | 2/2002 | McIntyre et al. |
| 6,358,341 B1 | 3/2002 | Bergquist |
| 6,359,270 B1 | 3/2002 | Bridson |
| 6,362,900 B1 | 3/2002 | Squilla et al. |
| 6,363,411 B1 | 3/2002 | Dugan et al. |
| 6,369,837 B1 | 4/2002 | Schirmer |
| 6,388,686 B1 | 5/2002 | Hetherington et al. |
| 6,388,732 B1 | 5/2002 | Williams et al. |
| 6,396,963 B2 | 5/2002 | Shaffer et al. |
| 6,405,178 B1 | 6/2002 | Manchala et al. |
| 6,407,745 B1 | 6/2002 | Yamada et al. |
| 6,407,777 B1 | 6/2002 | DeLuca |
| 6,408,301 B1 | 6/2002 | Patton et al. |
| 6,411,744 B1 | 6/2002 | Edwards |
| 6,411,999 B1 | 6/2002 | Tinkler |
| 6,424,789 B1 | 7/2002 | Abdel-Mottaleb |
| 6,434,579 B1 | 8/2002 | Shaffer et al. |
| 6,437,306 B1 | 8/2002 | Melen |
| 6,437,797 B1 | 8/2002 | Ota |
| 6,441,854 B2 | 8/2002 | Fellegara et al. |
| 6,463,462 B1 | 10/2002 | Smith et al. |
| 6,463,468 B1 | 10/2002 | Buch et al. |
| 6,473,803 B1 | 10/2002 | Stern et al. |
| 6,484,189 B1 | 11/2002 | Gerlach, Jr. et al. |
| 6,493,685 B1 | 12/2002 | Ensel et al. |
| 6,496,744 B1 | 12/2002 | Cook |
| 6,496,851 B1 | 12/2002 | Morris et al. |
| 6,512,570 B2 | 1/2003 | Garfinkle et al. |
| 6,519,632 B1 | 2/2003 | Brackett et al. |
| 6,522,351 B1 | 2/2003 | Park |
| 6,522,418 B2 | 2/2003 | Yokomizo et al. |
| 6,526,215 B2 | 2/2003 | Hirai et al. |
| 6,538,698 B1 | 3/2003 | Anderson |
| 6,552,729 B1 | 4/2003 | Di Bernardo et al. |
| 6,552,743 B1 | 4/2003 | Rissman |
| 6,567,825 B2 | 5/2003 | Bogia |
| 6,567,980 B1 | 5/2003 | Jain et al. |
| 6,567,983 B1 * | 5/2003 | Shiimori ..................... 725/105 |
| 6,571,255 B1 | 5/2003 | Gonsalves et al. |
| 6,573,927 B2 | 6/2003 | Parulski et al. |
| 6,577,760 B1 | 6/2003 | Ohta et al. |
| 6,583,799 B1 | 6/2003 | Manolis et al. |
| 6,587,596 B1 * | 7/2003 | Haeberli ..................... 382/283 |
| 6,590,584 B1 * | 7/2003 | Yamaura et al. ............ 715/704 |
| 6,590,586 B1 | 7/2003 | Swenton-Wall et al. |
| 6,609,106 B1 | 8/2003 | Robertson |
| 6,625,624 B1 | 9/2003 | Chen et al. |
| 6,625,651 B1 | 9/2003 | Swartz et al. |
| 6,631,522 B1 | 10/2003 | Erdelyi |
| 6,633,689 B2 | 10/2003 | Yamamoto |
| 6,636,648 B2 | 10/2003 | Loui et al. |
| 6,643,663 B1 | 11/2003 | Dabney et al. |
| 6,647,125 B2 | 11/2003 | Matsumoto et al. |
| 6,647,126 B1 | 11/2003 | Wen |
| 6,668,134 B1 * | 12/2003 | Niikawa ..................... 386/95 |
| 6,686,918 B1 | 2/2004 | Cajolet et al. |
| 6,701,011 B1 | 3/2004 | Nakajima |
| 6,701,343 B1 | 3/2004 | Kenyon |
| 6,771,801 B1 * | 8/2004 | Fisher et al. ................. 382/112 |
| 6,819,449 B2 * | 11/2004 | Haneda et al. ............... 358/1.6 |
| 6,847,373 B1 | 1/2005 | Gonsalves et al. |
| 6,912,311 B2 * | 6/2005 | Anderson et al. ........... 382/209 |
| 6,940,526 B2 * | 9/2005 | Noda et al. .................. 345/629 |
| 6,954,282 B2 * | 10/2005 | Miyamoto et al. ......... 358/1.18 |
| 2001/0032229 A1 | 10/2001 | Hulls et al. |
| 2001/0032443 A1 | 10/2001 | Tiley et al. |
| 2001/0034646 A1 | 10/2001 | Hoyt et al. |
| 2001/0037205 A1 | 11/2001 | Joao |
| 2001/0041022 A1 | 11/2001 | Edwards |
| 2002/0049624 A1 | 4/2002 | Raveis, Jr. |
| 2002/0052785 A1 | 5/2002 | Tenenbaum |
| 2002/0059364 A1 | 5/2002 | Coulthard et al. |
| 2002/0071028 A1 | 6/2002 | Ezawa |
| 2002/0091576 A1 | 7/2002 | Giordano, III et al. |
| 2002/0118182 A1 | 8/2002 | Luther |
| 2002/0133412 A1 | 9/2002 | Oliver et al. |
| 2002/0149676 A1 | 10/2002 | Hatori |
| 2002/0178450 A1 | 11/2002 | Morita et al. |
| 2003/0034979 A1 | 2/2003 | Nakamura et al. |
| 2003/0093493 A1 | 5/2003 | Watanabe et al. |
| 2003/0097361 A1 | 5/2003 | Huang et al. |
| 2003/0163431 A1 | 8/2003 | Ginter et al. |
| 2003/0167213 A1 | 9/2003 | Jammes et al. |
| 2004/0078274 A1 | 4/2004 | Aarnio |
| 2005/0231611 A1 | 10/2005 | Anderson et al. |

* cited by examiner

SYSTEM AND METHOD FOR EDITING DIGITAL IMAGES

RELATED APPLICATIONS

This application is a continuation of application Ser. No. 09/769,686, filed Jan. 24, 2001 now U.S. Pat. No. 7,136,528, which claimed the benefit of U.S. Provisional Application No. 60/181,844, filed Feb. 11, 2000.

FIELD OF THE INVENTION

This invention relates generally to digital imaging, and, more particularly, to a system and method for editing digital images.

COPYRIGHT NOTICE/PERMISSION

A portion of the disclosure of this patent document may contain material subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Sony Electronics, Inc., All Rights Reserved.

BACKGROUND OF THE INVENTION

With the increasing popularity of computers and the widespread use of the Internet, and especially of the World Wide Web, in many fields, traditional analog technology is being replaced by digital technology. One example of this transformation is in the field of photography. It is well known in the art that traditional photography involves conventional film and chemical processing, whereas digital photography involves the creation of digital photography files and the manipulation of the digital photographs through digital processing.

Generally, digital photography is advantageous over traditional photography since the repetitive costs of film and chemical processing are eliminated. Furthermore, digital photography files provide a permanent storage format previously unavailable to photographers. At the same time, a series of image editing operations may be performed on digital photographs, including cropping, color enhancement, changes to brightness, color, or luminosity, or image effects.

Although the same image editing operations may be subsequently applied to several digital images, the edited images may have different image characteristics. Therefore, the edited images may not be combined or otherwise used together without some degree of difficulty.

SUMMARY

A system for editing digital images forms an image template containing a selected record of one or more image editing operations performed on a first image to obtain a first edited image. The image template also contains the first edited image. The system then applies the image template to one or more second images. In one aspect, the selected record of the one or more image editing operations is stored with the first edited image in an image file. In another aspect, the selected record of image editing operations is stored in a storage file separate from the first edited image.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION

In the following description, reference is made to the accompanying drawings, in which like references indicate similar elements, and in which are shown, by way of illustration, embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following description is, therefore, not to be taken in a limiting sense, and the scope of the present invention is defined only by the appended claims.

Figure 1A:
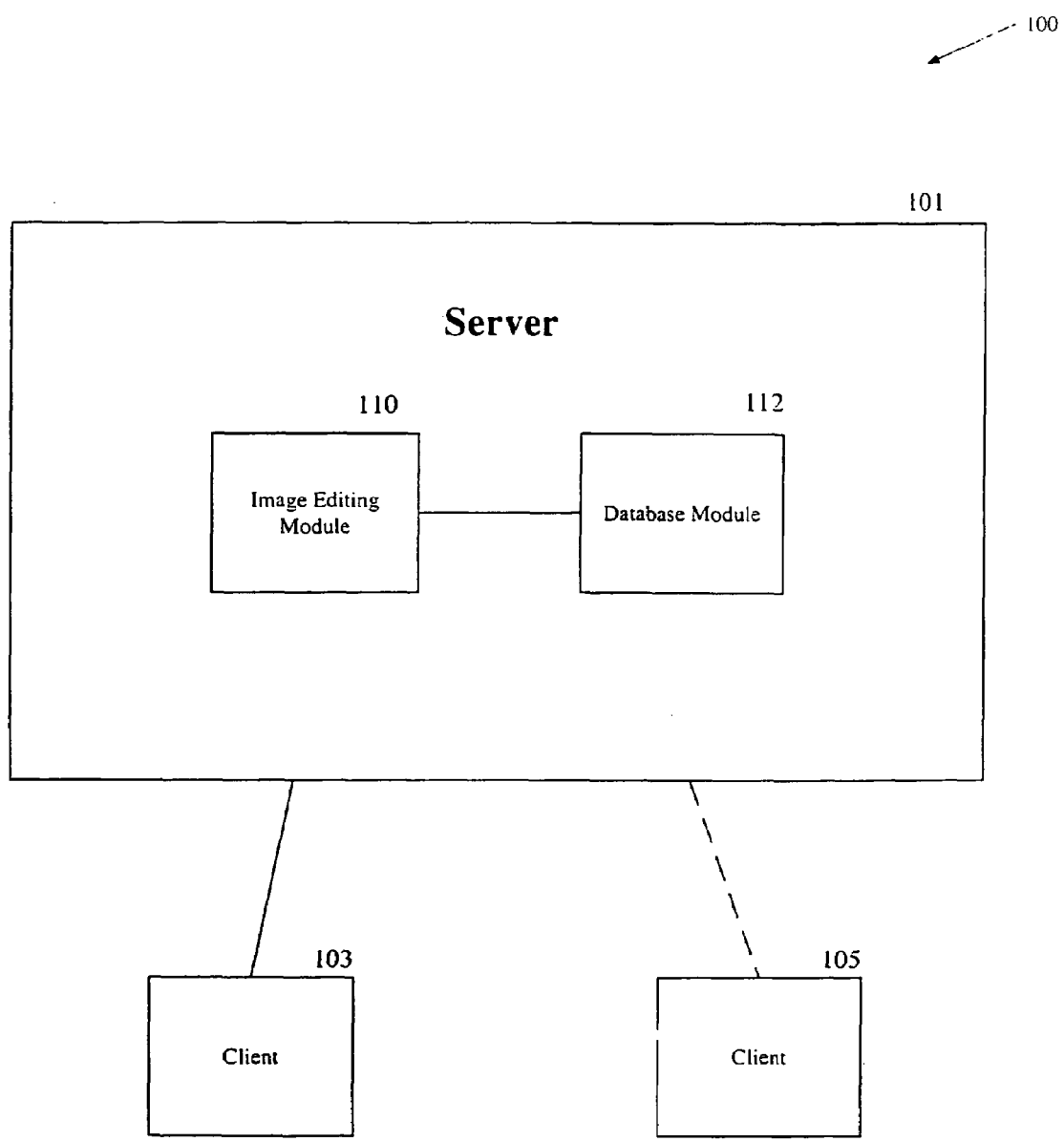
FIG. 1A is a block diagram illustrating one embodiment of a system for editing digital images.

Beginning with an overview of the operation of the invention, FIG. 1A illustrates one embodiment of a system 100 for editing digital images. System 100 includes server 101 and one or more clients 103, 105. Client 103 represents any device that may enable user's online access to information. In one embodiment, client 103 is a device, which allows a user to interact with server 101. In this embodiment, client 103 may provide a user interface to communicate information to the user, for example a display means to present such information to the user. Also, client 103 may provide a second user interface to allow the user to communicate information to client 103, for example an input means such as a keyboard.

In one embodiment, server 101 includes an image editing module 110 and a database module 112, coupled to the image editing module 110. Database module 112 stores images and provides the images to client 103 upon request from users. Server 101 receives a request to display an image, retrieves the image from database module 112, and provides that image to client 103. Server 101 also receives an electronic representation of one or more image editing operations from client 103 and processes this electronic representation using the image editing module 110 to obtain an edited image. In one embodiment, server 101 performs the image editing operations on the retrieved image to obtain the edited image. Alternatively, client 103 may directly perform the image editing operations on the retrieved image.

Server 101 then selectively stores the image editing operations in the database module 112 and provides the edited image to client 103. It should be noted that a wide variety of services other than the services described above may be provided by server 101 to client 103 without loss of generality. In one embodiment, server 101 displays various advertisements when providing a service to one or more clients 103. In this embodiment, server 101 may receive compensation from a source whose advertisements are presented to client(s) 103.

It should be noted that although FIG. 1A illustrates only two modules performing the above functionality, more or less modules may be used to perform this functionality. In addition, in another embodiment (not shown), a part of this functionality is performed by a module or several modules residing on client 103 (e.g., image editing module 110 resides on client 103 and database module 112 resides on server 101). In yet another embodiment, all modules performing the above functionality (e.g., both image editing module 110 and database module 112) reside on client 103, and client 103 may or may not be connected to server 101.

Figure 1B:
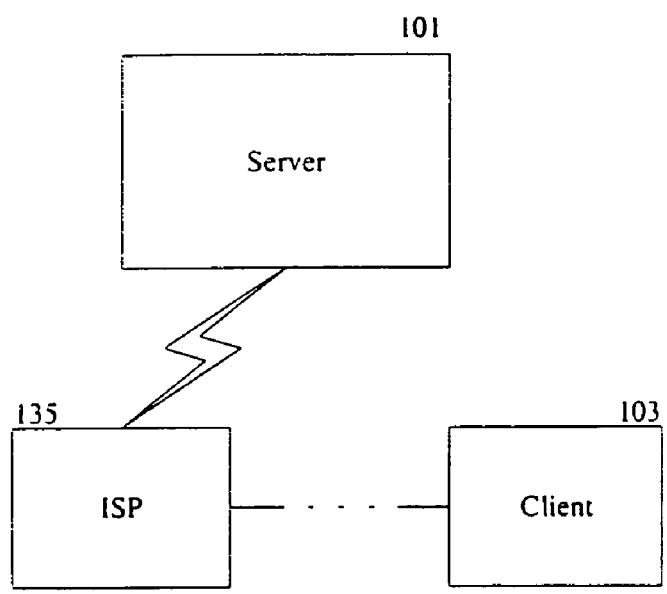
FIG. 1B is a block diagram of one embodiment of an operating environment in which the system illustrated in FIG. 1A may function.

In one embodiment of a system for editing digital images, as shown in FIG. 1B, server 101 hosts a web site and is part of, or coupled to, an Internet Service Provider (ISP) 135 to provide services over the Internet. The client computer 103 executes a conventional Internet browsing application to exchange data with the server 101. It is readily apparent that the present invention is not limited to Internet access and Internet web-based sites; directly coupled and private networks are also contemplated.

Figure 1C:
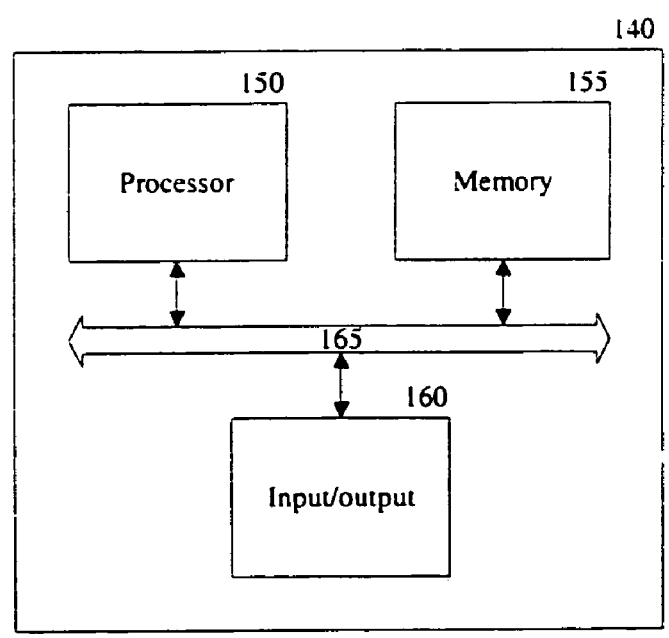
FIG. 1C is a block diagram of one embodiment of a computer architecture which can be used by the system illustrated in FIG. 1A.

One embodiment of a computer system 140 suitable for use as server 101 is illustrated in FIG. 1C. In some embodiments, in which client 103 is a computer, computer system 140 may also be suitable for use as client 103. Computer system 140 includes a processor 150, a memory 155 and input/output capability 160 coupled to a system bus 165. Memory 155 is configured to store instructions which, when executed by processor 150, perform the methods described herein. Input/output 160 provides for the delivery and display of information to the users. Input/output 160 also encompasses various types of computer-readable media, including any type of storage device that is accessible by the processor 150. One of skill in the art will immediately recognize that the term "computer-readable medium/media" further encompasses a carrier wave that encodes a data signal. It will also be appreciated that the server 101 is controlled by operating system software executing in memory 155. Input/output and related media 160 store the computer-executable instructions for the operating system and methods of the present invention.

The description of FIG. 1B and FIG. 1C is intended to provide an overview of computer hardware and other operating components suitable for implementing the invention, but is not intended to limit the applicable environments. It will be appreciated that computer system 140 is one example of many possible computer systems that have different architectures. A typical computer system will usually include at least a processor, memory, and a bus coupling the memory to the processor. One of skill in the art will immediately appreciate that the invention can be practiced with other computer system configurations, including microprocessor systems, minicomputers, mainframe computers, and the like. The invention can also be practiced in distributed computing environments where tasks are performed by remote processing devices that are linked through a communications network.

Figure 2:
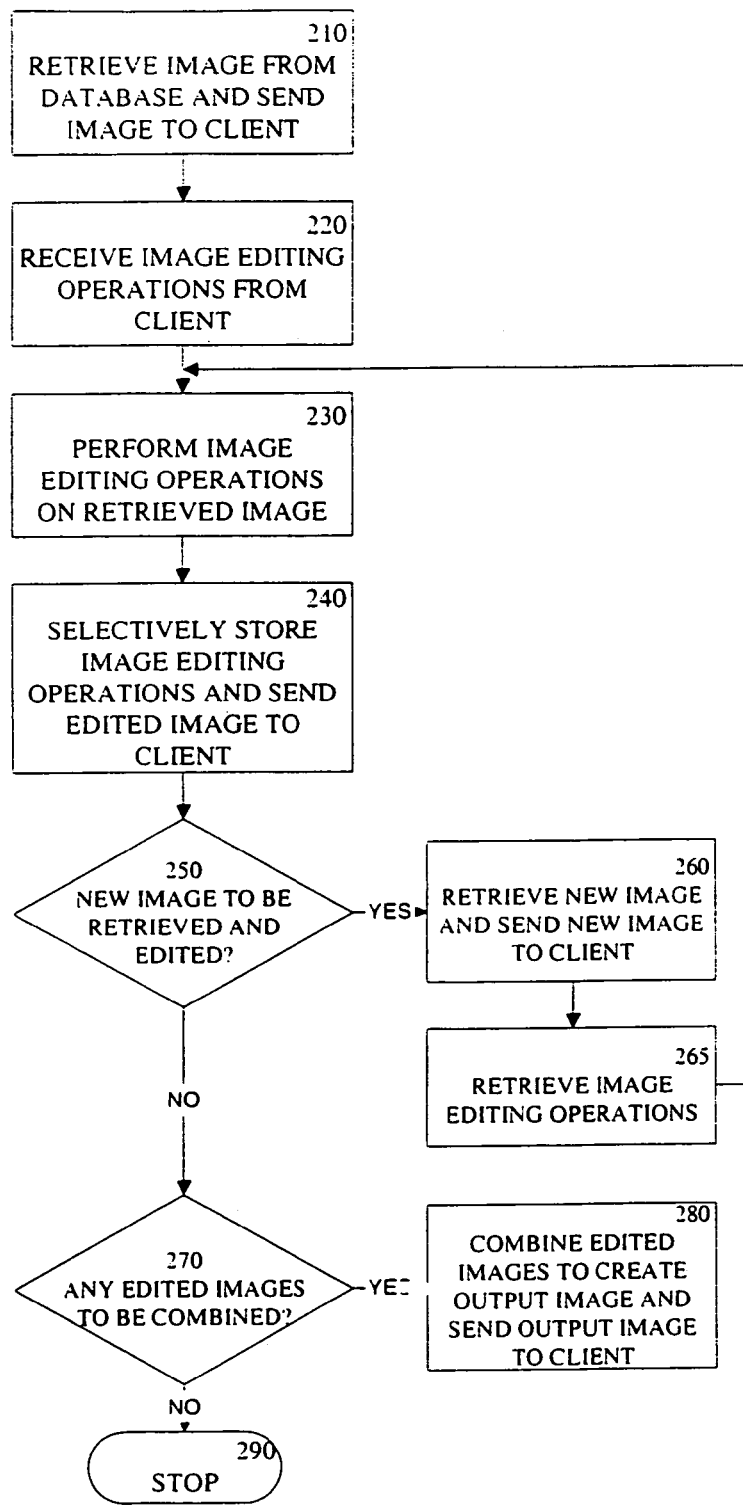
FIG. 2 is a flow diagram of one embodiment of a method for editing digital images from the server's perspective.
Figure 3:
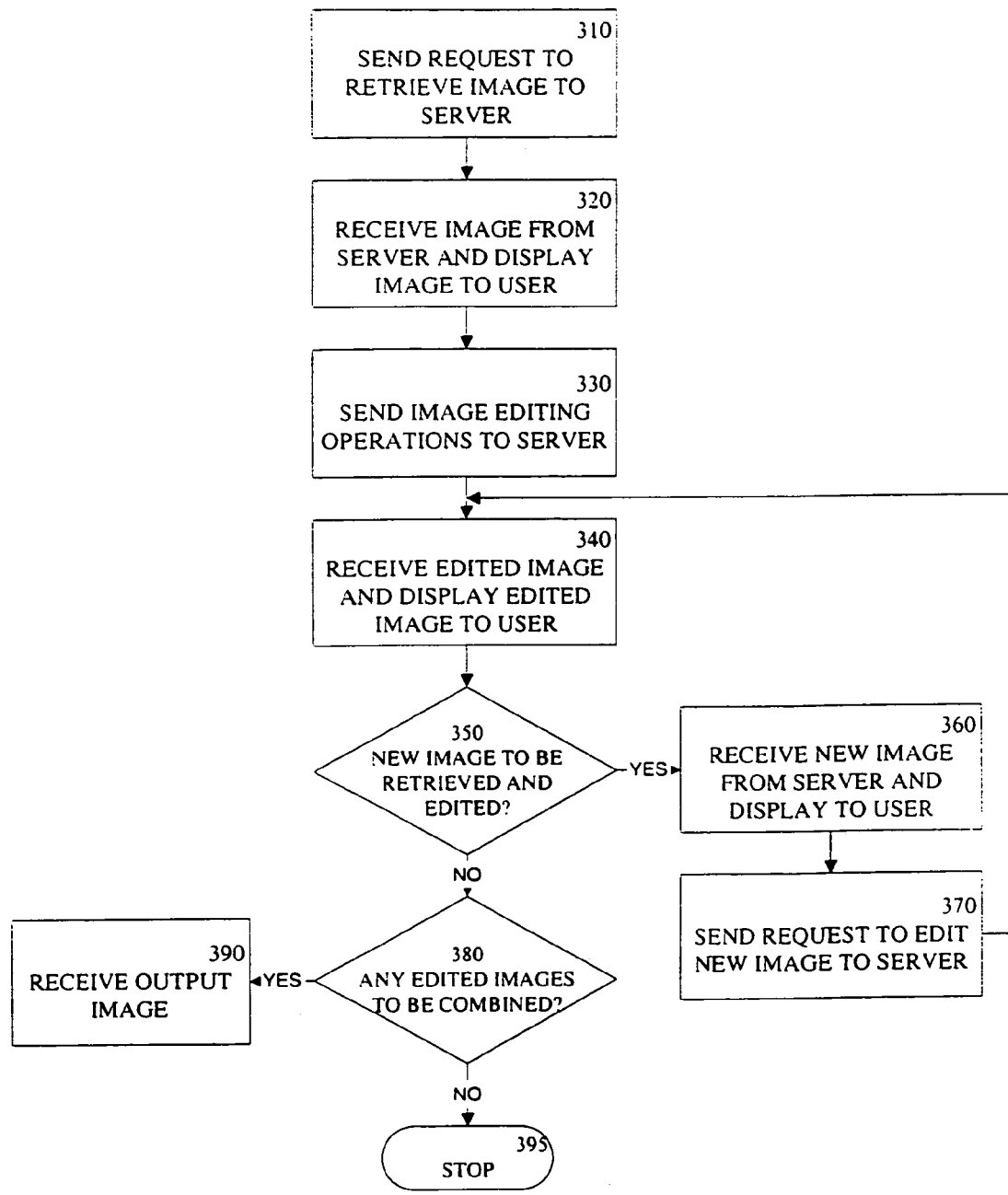
FIG. 3 is a flow diagram of one embodiment of the method for editing digital images from the client's perspective.

Next, the particular methods of the invention are described in terms of computer software with reference to flow diagrams. FIG. 2 and FIG. 3 are flow diagrams of one embodiment of a method for editing digital images from the server's perspective and, respectively, from the client's perspective. The methods constitute computer programs made up of computer-executable instructions illustrated as blocks (acts) 210-290 in FIG. 2, and blocks (acts) 310-395 in FIG. 3. Although these blocks are shown in a particular order, this order may not be followed and may be changed without loss of generality. In addition, not all blocks within the flow diagrams of FIG. 2 or FIG. 3 may be needed to execute a corresponding method.

Describing the computerized methods by reference to flow diagrams enables one skilled in the art to develop programs including instructions to carry out the methods on a suitable computer (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g. program, procedure, process, application, module, logic, etc.), as taking an action or causing a resolve. Such expressions are merely a shorthand way of saying that execution of the software by a computer causes the processor of the computer to perform an action or produce a result.

FIG. 2 is a flow diagram of one embodiment of a method for editing digital images from the server's perspective. At processing block 210, an image is retrieved from database module 112 and sent to client 103, based on a request to display the image received from client 103.

At processing block 220, one or more image editing operations are received from client 103. In one embodiment, the image editing operations may include cropping of the image, enhancing color characteristics of the image, changing brightness, color, or luminosity characteristics of the image, and applying an image effect, such as a filter, to the image. Alternatively, other image editing operations may be transmitted from client 103 to the server for processing.

At processing block 230, the image editing operations are performed on the retrieved image to obtain an edited image. In one embodiment, the image editing module 110 shown in FIG. 1A performs the image editing operations. Alternatively, other modules within server 101 may perform the image editing operations.

At processing block 240, image editing operations are selectively stored in database module 112 and the edited image is sent to client 103. In one embodiment, a selected record of the image editing operations is stored together with the edited image in an image file. Alternatively, the selected record of the image editing operations may be stored in a separate storage file, which resides in a different location than the storage location of the edited image. In one embodiment, all image editing operations performed are stored as part of the record in database module 112. Alternatively, some image editing operations may be discarded before being stored as part of the selected record.

The edited image and the record of editing image operations form an image template. In one embodiment, the image template is applied to a new image to ensure that the same editing image operations are performed on the new image and that the image characteristics of the new edited image are identical to the image characteristics of the edited image.

At processing block 250, a decision is made whether a second new image must be retrieved and edited. In one embodiment, the user decides whether to edit a new image and communicates the decision to client 103, which forwards the decision to server 101.

If a second new image is to be retrieved and edited, at processing block 260, the new image is retrieved from database module 112 and is sent to client 103. Next, at processing block 265, upon receiving of a request to edit the new image, the image editing operations within the stored record are retrieved and processing blocks 230 through 250 are repeated.

Otherwise, at processing block 270, a decision is made whether any stored edited images are to be combined. In one embodiment, the user decides whether to combine two or more of the edited images or portions thereof and communicates the decision to client 103, which forwards it to the server.

If a decision is made to combine the edited images, the edited images are retrieved and combined to obtain an output image, which is then sent to client 103. In one embodiment, the edited images are combined automatically. Alternatively, a series of operations may be performed to combine the entire edited images or portions of the edited images. Otherwise, if edited images need not be combined, the procedure stops at processing block 290.

FIG. 3 is a flow diagram of one embodiment of the method for editing digital images from the client's perspective. At processing block 310, a request to display an image is sent to server 101.

At processing block 320, the image is received from server 101 and is displayed for the user. Then, at processing block 330, one or more image editing operations are received from the user and are sent to server 101. In one embodiment, the image editing operations may include cropping of the image, enhancing color characteristics of the image, changing brightness, color, or luminosity characteristics of the image, and applying an image effect, such as a filter, to the image. Alternatively, other image editing operations may be transmitted to the server for processing.

At processing block 340, an edited image is received from server 101 and is displayed for the user. At processing block 350, a decision is made whether a second new image must be retrieved and edited. In one embodiment, the user decides whether to edit a new image and communicates the decision to server 101.

If a new image is to be retrieved and edited, at processing block 360, a new image is received from the server and is displayed for the user. Next, at processing block 370, a request to edit the new image is transmitted to the server 101 and processing blocks 340 through 350 are repeated.

Otherwise, at processing block 380, a decision is made whether any stored edited images are to be combined. In one embodiment, the user decides whether to combine two or more of the edited images or portions of the edited images and communicates the decision to server 101.

If edited images are to be combined, then at processing block 390, an output image representing the combination of the edited images is received. Otherwise, the procedure stops at processing block 395.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention.

The terminology used in this application with respect to network architecture is meant to include all client-server environments. Therefore, it is manifestly intended that this invention be limited only by the following claims and equivalents thereof.

What is claimed is:

1. A method comprising:
   forming an image template containing a first edited image and a selected record of an image editing operation, said image editing operation having been performed on a first image to obtain said first edited image; and
   applying said image template to at least one second image, said applying of said image template comprises performing said image editing operation on said second image to obtain a second edited image.

2. The method according to claim 1, wherein said forming comprises storing said selected record of said image editing operation with said first edited image in an image file.

3. The method according to claim 1, wherein said forming comprises storing said selected record of said image editing operation in a storage file separate from said first edited image.

4. The method according to claim 1, wherein said image editing operation comprises cropping said first image.

5. The method according to claim 1, wherein said image editing operation comprises an operation of enhancing color characteristics of said first image.

6. The method according to claim 1, wherein said image editing operation comprises an operation of modifying brightness characteristics of said first image.

7. The method according to claim 1, wherein said image editing operation comprises an operation of modifying luminosity characteristics of said first image.

8. The method according to claim 1 being performed within a microprocessor system.

9. A method comprising:
   forming an image template including a first edited image and a selected record of an image editing operation, said image editing operation being performed on a first image to produce said first edited image; and
   applying said image template to a second image to perform said image editing operation on said second image to produce a second edited image.

10. The method according to claim 9 further comprising:
    combining the first edited image and the second edited image to produce an output image to be provided to a device supplying at least the first image.

11. The method according to claim 9, wherein said forming comprises storing said selected record of said image editing operation with said first edited image in an image file.

12. The method according to claim 9, wherein said forming comprises storing said selected record of said image editing operation in a storage file separate from said first edited image.

13. The method according to claim 9, wherein said image editing operation comprises cropping said first image.

14. The method according to claim 9 being performed within a microprocessor system.

15. A computer readable storage medium containing executable instructions, which, when executed in a processing system, cause said processing system to perform a plurality of operations comprising:
   forming an image template containing a first edited image and a selected record of at least one image editing operation, said at least one image editing operation having been performed on a first image to obtain said first edited image; and applying said image template to at least one second image and performing said at least one image editing operation on said second image to obtain a second edited image so that said first edited image and said second edited image include at least one identical image characteristic.

16. The computer readable storage medium according to claim 15, wherein said processing system, when forming said image template, retrieves said selected record to determine said image editing operation performed on said first edited image combining said second edited image with said first edited image to form an output image.

17. The computer readable storage medium according to claim 15, wherein said processing system, when forming said image template, combines said second edited image with said first edited image to form an output image.

18. The computer readable storage medium according to claim 15, wherein said processing system, comprises combining said second edited image with said first edited image to form an output image.

19. The computer readable storage medium according to claim 18, wherein said processing system, when combining said first edited image and said second edited image, comprises transmitting said output image to a user.

* * * * *